United States Patent
Ziethe et al.

(10) Patent No.: US 9,828,067 B2
(45) Date of Patent: Nov. 28, 2017

(54) ROOF MODULE, AND VEHICLE HAVING AN ACCOMMODATION FACILITY COMPRISING A ROOF MODULE

(71) Applicant: SMF Vertriebs GmbH, Tamm (DE)

(72) Inventors: Axel Ziethe, Stuttgart (DE); Johannes Reichel, Bietigheim-Bissingen (DE)

(73) Assignee: Axel Ziethe (DE)

( * ) Notice: Subject to any disclaimer, the term of this patent is extended or adjusted under 35 U.S.C. 154(b) by 122 days.

(21) Appl. No.: 14/673,226

(22) Filed: Mar. 30, 2015

(65) Prior Publication Data

US 2015/0274259 A1    Oct. 1, 2015

(30) Foreign Application Priority Data

Mar. 31, 2014  (DE) .................. 10 2014 206 059

(51) Int. Cl.
| | | |
|---|---|---|
| *B63B 19/18* | (2006.01) | |
| *B60J 10/82* | (2016.01) | |
| *B60J 7/00* | (2006.01) | |
| *B60J 7/043* | (2006.01) | |
| *B60J 7/047* | (2006.01) | |
| *B60J 7/053* | (2006.01) | |
| *B60J 7/057* | (2006.01) | |
| *B60J 7/06* | (2006.01) | |
| *B63B 19/19* | (2006.01) | |
| *E05F 17/00* | (2006.01) | |

(52) U.S. Cl.
CPC ............. *B63B 19/18* (2013.01); *B60J 7/0084* (2013.01); *B60J 7/043* (2013.01); *B60J 7/047* (2013.01); *B60J 7/053* (2013.01); *B60J 7/0573* (2013.01); *B60J 7/061* (2013.01); *B60J 7/064* (2013.01); *B60J 10/82* (2016.02); *B63B 19/19* (2013.01); *E05F 2017/005* (2013.01)

(58) Field of Classification Search
CPC ................................ B63B 19/18; B60J 10/82
USPC ........................................................... 114/202
See application file for complete search history.

(56) References Cited

U.S. PATENT DOCUMENTS

| | | | | |
|---|---|---|---|---|
| 4,685,411 A | * | 8/1987 | Wick ................... | B63B 19/02 114/202 |
| 5,707,102 A | * | 1/1998 | Takahashi ............. | B60J 10/82 296/221 |
| 5,947,178 A | * | 9/1999 | Patten ................... | E04H 4/088 160/193 |

(Continued)

FOREIGN PATENT DOCUMENTS

DE             81 04 849 U1     9/1982

*Primary Examiner* — Lars A Olson
*Assistant Examiner* — Jovon Hayes
(74) *Attorney, Agent, or Firm* — Akerman LLP

(57) ABSTRACT

The invention relates to a roof module for a land and/or water vehicle (10) having an accommodation facility comprising a kinematic unit (3) with two lateral guide rails (30), at least one roof segment (2) which is mounted in the guide rails (30) such that it can be moved between a closed position and an open position, and a circumferential load-bearing frame (4) with four profiled strips (40) which are connected to form a rectangle, which load-bearing frame (4) can be fastened to a vehicle roof (100) which has an opening (101) so as to surround the opening (101) or can be fastened in the opening (101) with the formation of a water barrier, the load-bearing frame (4) at least partially supporting and/or partially forming the kinematic unit (3).

21 Claims, 5 Drawing Sheets

(56) References Cited

U.S. PATENT DOCUMENTS

Figure 1:
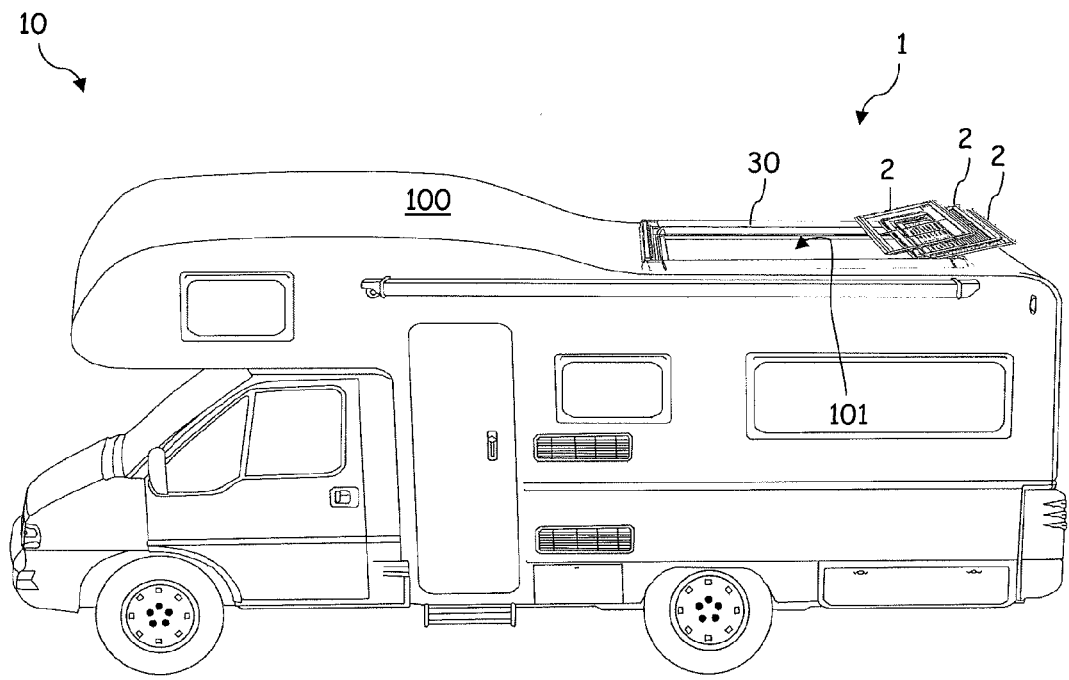

| | | | | |
|---|---|---|---|---|
| 6,073,574 A * | 6/2000 | King | ................. | B63B 35/71 |
| | | | | 114/201 R |
| 6,158,372 A * | 12/2000 | Erskine | ............... | B63B 19/00 |
| | | | | 114/177 |
| 6,352,046 B1 * | 3/2002 | Berg, Sr. | ............. | B63B 19/18 |
| | | | | 114/201 R |
| 6,357,379 B1 * | 3/2002 | Murphy, Jr. | ......... | B63B 17/02 |
| | | | | 114/361 |
| 6,516,740 B2 * | 2/2003 | Berg, Sr. | ............. | B63B 27/14 |
| | | | | 114/201 R |
| 7,451,717 B1 * | 11/2008 | Levine | ................. | B63B 9/00 |
| | | | | 114/174 |
| 7,543,778 B2 * | 6/2009 | Baderspach | ...... | B64C 1/1492 |
| | | | | 244/129.3 |
| 7,731,574 B2 * | 6/2010 | Milks | ................ | B60J 7/1642 |
| | | | | 296/216.02 |
| 9,233,734 B2 * | 1/2016 | Erskine | ............... | E05F 1/16 |
| 2014/0000168 A1 * | 1/2014 | Uehara | ............ | E06B 3/5054 |
| | | | | 49/149 |
| 2014/0054932 A1 * | 2/2014 | Kanai | ................ | B60J 7/1642 |
| | | | | 296/216.01 |

\* cited by examiner

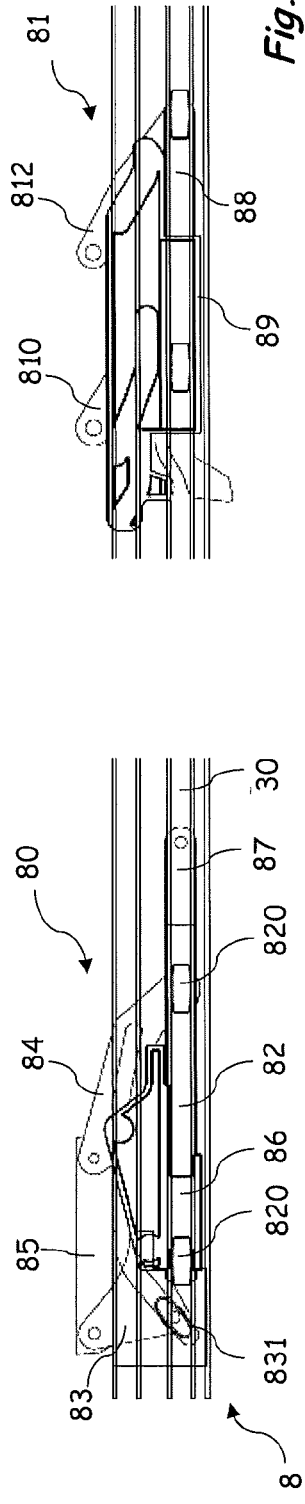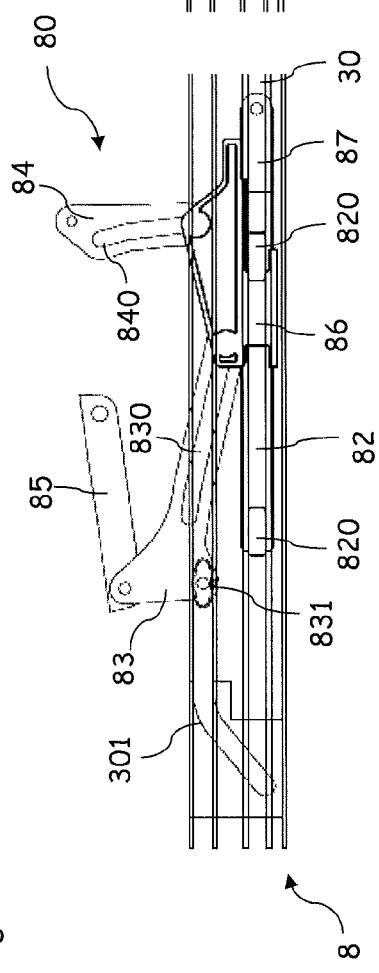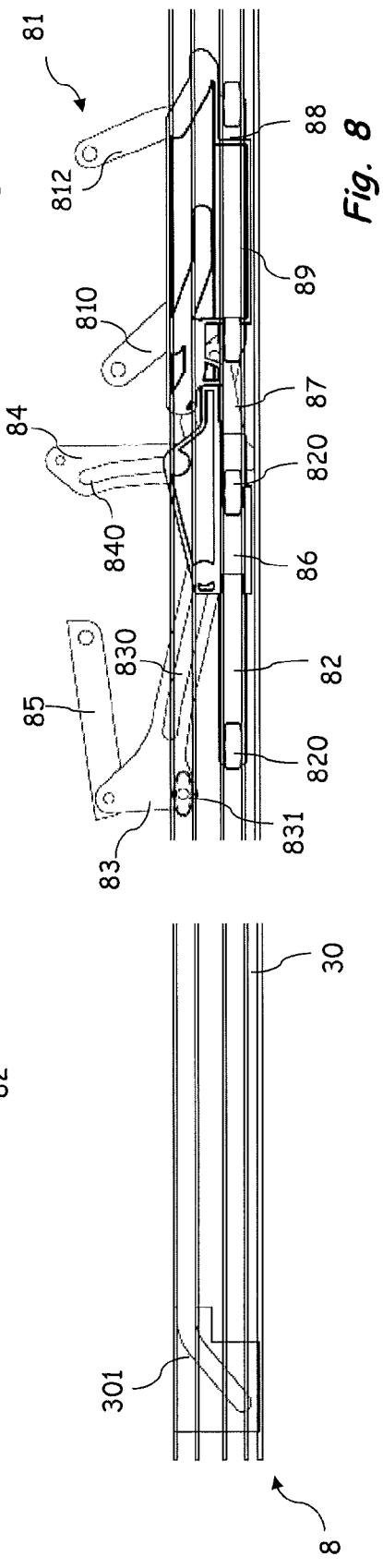

ROOF MODULE, AND VEHICLE HAVING AN ACCOMMODATION FACILITY COMPRISING A ROOF MODULE

CROSS-REFERENCE TO RELATED APPLICATIONS

The present application claims priority to German Patent Application No. DE 10 2014 206 059.1, filed Mar. 31, 2014, the entirety of which is incorporated herein by reference.

The invention relates to a roof module for a land and/or water vehicle having an accommodation facility and to a land and/or water vehicle having an accommodation facility which has a roof module.

In conjunction with the application, caravans, motor homes and similar vehicles are called land vehicles having an accommodation facility. In conjunction with the application, in particular, a trailer for motor vehicles, in which trailer an accommodation facility is situated, is called a caravan. A motor vehicle having an interior facility which is suitable for living is called a motor home. Vehicles of this type serve as accommodation on holidays, but also as temporary or permanent places of residence. Vehicles which are suitable for movement on the water are called water vehicles. Depending on the design, movement takes place by way of sails and/or in a motor-operated manner. Land and/or water vehicles will also be called vehicles for short in the following text.

It is known to design vehicles with accommodation facilities with windows in the side walls and/or roof hatches which can be folded open. Furthermore, it is known for ventilation to provide weather-protected ventilating openings on a vehicle roof and/or side walls.

There is the requirement to equip vehicles of this type with large-area windows which can be opened if required for sufficient ventilation, an exclusive ambience and/or for a more intensive experience of nature. For this purpose, it is known, for example, from DE 81 04 849 U1 to configure a vehicle with a ventilating opening which can be closed in the roof, it being possible for the ventilating opening to be closed by way of a tilt/slide roof which forms a structural unit and for the tilt/slide roof to be moved, at least in its ventilating position, next to the ventilating opening from its normal position, in which it is situated above the ventilating opening. In practice, however, tilt/slide roofs of this type have not established themselves.

It is an object of the present invention to provide a roof module which can be realized inexpensively. It is a further object of the invention to provide a land and/or water vehicle with a roof module.

This object is achieved by way of the subjects having the features of claims 1 and 15. Further advantages of the invention result from the subclaims.

According to a first aspect, a roof module for a land and/or water vehicle having an accommodation facility is provided, comprising a kinematic unit with two lateral guide rails, at least one roof segment which is mounted in the guide rails such that it can be moved between a closed position and an open position, and a circumferential load-bearing frame with four profiled strips which are connected to form a rectangle, it being possible for the load-bearing frame to be fastened to a vehicle roof which has an opening so as to surround the opening or to be fastened in the opening with the formation of a water barrier, and the load-bearing frame at least partially supporting and/or partially forming the kinematic unit.

In one design of the load-bearing frame with four profiled strips, a simple adaptation of the size and/or shape of the roof module to given frame conditions is possible by way of selection of the length of the profiled strips. Here, the suitable design of the at least one roof segment makes a further adaptation possible to boundary conditions which exist on account of the vehicle. A roof module is therefore provided which is suitable for a multiplicity of vehicles of different sizes. As a result, the roof module can also be realized inexpensively for series vehicles in low quantities or vehicles which are manufactured in individual production.

The load-bearing frame is arranged with the formation of a water barrier on the vehicle roof, preferably so as to surround the opening on the vehicle roof. Fastening takes place in advantageous embodiments by means of adhesive bonding, in particular by way of an adhesive bead. In other embodiments, a connection by means of screwing, riveting or the like is provided as an alternative or in addition.

In one embodiment, the kinematic unit is formed at least partially by the load-bearing frame. It is provided, in particular, in one embodiment that lateral profiled strips are manufactured in one piece with the guide rails. In other embodiments, the guide rails are manufactured separately and are fastened to the profiled strips. The kinematic means preferably comprises further elements, by way of which an adjustment of the roof segments can be accomplished. In addition to the guide rails, the load-bearing frame preferably also receives the further elements of the kinematic unit, with the result that a roof module which can be preassembled is produced. In advantageous embodiments, the kinematic unit comprises at least one connecting element, preferably two connecting elements, by means of which the guide rails are connected at their ends. Here, the guide rails and the connecting elements likewise form a rectangular frame which can be inserted in a preassembled manner into the load-bearing frame.

In advantageous embodiments, all four profiled strips are manufactured in a structurally identical manner for particularly inexpensive production. Here, profiled strips with an identical cross section which can be cut to a suitable length are called structurally identical. Here, the guide rails are mounted on the lateral profiled strips.

The profiled strips are connected to form the rectangular load-bearing frame. In one embodiment, the profiled strips are connected to one another using a mitre joint. Here, the abutting regions of the profiled strips are covered with covers or the like in one embodiment.

In preferred embodiments, the four profiled strips are connected by means of corner pieces. As a result, reliable and simple connection of the profiled strips to form a rectangle is possible. Sharp-edged transitions can be avoided by means of suitable design of the corner pieces.

In advantageous embodiments, the at least one roof segment bears against the load-bearing frame in the closed position with the formation of at least one first sealing line, preferably with the formation of a first and a second sealing line, the guide rails being arranged within one sealing line, preferably within both sealing lines. As a result, the guide rails are arranged in a dry region in a closed state of the roof module and are protected against contamination and moisture in the closed state of the roof module. This is advantageous, in particular, if lines or cables for an adjusting device which can be actuated by motor are laid in the guide rails.

In advantageous embodiments, a circumferential seal element is provided on the load-bearing frame, on which seal element the at least one roof segment lies in the closed position with the formation of the first and/or the second sealing line.

In preferred embodiments, the profiled strips have a channel for conducting water, a water run-off being provided on corner regions of the load-bearing frame, in particular in the corner pieces. In one embodiment with a first and a second sealing line, the channel is preferably provided between the sealing lines and makes it possible for water which has entered via the first sealing line to run off. Via the channels and the run-offs, a space between the sealing lines is communicated with the surroundings, with the result that drying of the said space is possible. This is advantageous, for example, when the at least one roof segment is moved into the closed position only as rain begins.

A height of the profiled strips is preferably selected in such a way that the load-bearing frame protrudes beyond the at least one roof segment in the closed position. In other words, the at least one roof segment is arranged so as to lie inside the load-bearing frame in the closed position. The aerodynamic properties of the profiled strips are preferably optimized under acoustic aspects, with regard to aesthetics and/or with regard to fuel consumption.

For a movement of the at least one roof segment, the kinematic unit preferably comprises an adjusting device, in particular an adjusting device which can be actuated by motor with a drive motor and a control unit for controlling the drive motor, and/or an adjusting device which can be actuated manually. Here, the adjusting device which can be actuated manually preferably has a gear mechanism, with the result that a user is assisted during the application of the forces which are necessary for the adjusting movement of the roof segments. An actuation of the adjusting device which can be actuated manually takes place by means of a crank in advantageous embodiments. A drive motor is provided as an alternative or in addition. Here, in one embodiment, the control unit for the drive motor is integrated into the control unit of the vehicle. In other embodiments, a separate control unit is provided which is preferably communicated with the control unit of the vehicle, with the result that, for example, a signal of a rain sensor which is present in the vehicle can be used to trigger a closing movement of the roof segment.

In one advantageous refinement, an anti-pinch protection means is realized by means of the control unit. In one embodiment, the anti-pinch protection means comprises a light barrier or an alternative sensor, by means of which a body part which is situated in the opening can be detected. In advantageous embodiments, a protective cover is provided on the opening, in particular a privacy screen cover, a UV protective cover, a mosquito net and/or a fly screen, the position of the protective cover being detected. Here, a movement into the closed position is possible only when the protective cover is closed. If closure is not possible, a warning signal is emitted in advantageous embodiments. The protective cover is designed, for example, as a roller blind or as a pleated blind.

In one embodiment, the at least one roof segment has a frame and a panel element which is preferably transparent or semi-transparent and is received in the frame. In conjunction with the application, a panel element is a substantially rigid component with a low wall thickness in comparison to its extent in the plane of the vehicle roof. In advantageous embodiments, flat panel elements are used. However, embodiments with curved panel elements are also conceivable. Here, depending on requirements, the panel element can be manufactured from glass or plastic. In advantageous embodiments, the panel element is manufactured from a material which filters UV radiation and/or is provided with a coating or protective film which filters UV radiation. As a result, fading of light-sensitive objects in the interior of the vehicle is prevented or at least slowed down. In alternative embodiments, the panel element is designed as a solar module and/or has a solar module. In other embodiments, coatings or films, for example for increased scratch resistance and/or an individual colour design, are provided as an alternative or in addition. In advantageous embodiments, the frame has a water run-off and/or a segment protective cover. Here, a protective cover which extends over only one roof segment and makes individual darkening possible is called a segment protective cover.

In advantageous embodiments, the at least one roof segment is guided in the guide rails by means of a lifter kinematic means, the lifter kinematic means being designed to raise up and tilt the at least one roof segment with respect to the guide rails during a movement from the closed position. As a result of the at least one roof segment being raised up, it is separated from the sealing elements. As a result of the tilting, wetness present on the roof segment is drained. Here, the frame of the at least one roof segment is preferably designed in such a way that wetness which is present on the roof segment is discharged via the frame in the case of tilting to the load-bearing frame and via the latter to the outside. Furthermore, the oblique position of the roof segment makes space-saving stacking of a plurality of roof segments possible, the said roof segments being arranged in an overlapped manner in the open position. The lifter kinematic means is preferably also designed to lock the at least one roof segment in the closed position.

A plurality of, in particular at least three, roof segments are preferably provided. The roof segments adjoin one another in a sealing manner in a closed position and form a flat group.

For reliable closure of the vehicle, at least one roof segment, in particular all roof segments, can be fixed in at least one position on at least one guide rail by means of a locking mechanism. If all roof segments are locked, it is possible to move a first roof segment into a ventilating position, the further roof segments preventing undesired sliding open of the roof segments. The ventilating position is preferably selected in such a way that it is prevented that a person enters via the opening. Penetration of light rain is preferably also prevented, furthermore.

As an alternative to a design by means of a plurality of panel-shaped roof segments, in one embodiment the roof segment comprises a foldable panel element which is guided by means of bows in the guide rails. Here, for reliable closure of the vehicle, at least one bow, in particular all bows, can be fixed in at least one position on at least one guide rail by means of a locking mechanism. If all bows are locked, it is possible here to adjust a first bow into a ventilating position, the further bows preventing undesired sliding open of the foldable roof segment. In one embodiment, the foldable panel element is made from a transparent material and/or has transparent sections.

In advantageous embodiments, the roof module comprises a cover frame which is attached during use to an inner side of the vehicle roof, it preferably being possible for the cover frame to be mounted on the load-bearing frame and/or the guide rails.

According to a second aspect, a vehicle having an accommodation facility and having a roof module according to the invention is provided.

Further advantages of the invention result from the dependent claims and from the following description of exemplary embodiments of the invention which are shown diagrammatically in the drawings. Consistent reference numerals are used for identical or similar components in the drawings. Features which are described or shown as part of one exemplary embodiment can likewise be used in another exemplary embodiment, in order to obtain a further embodiment of the invention.

Figure 2:
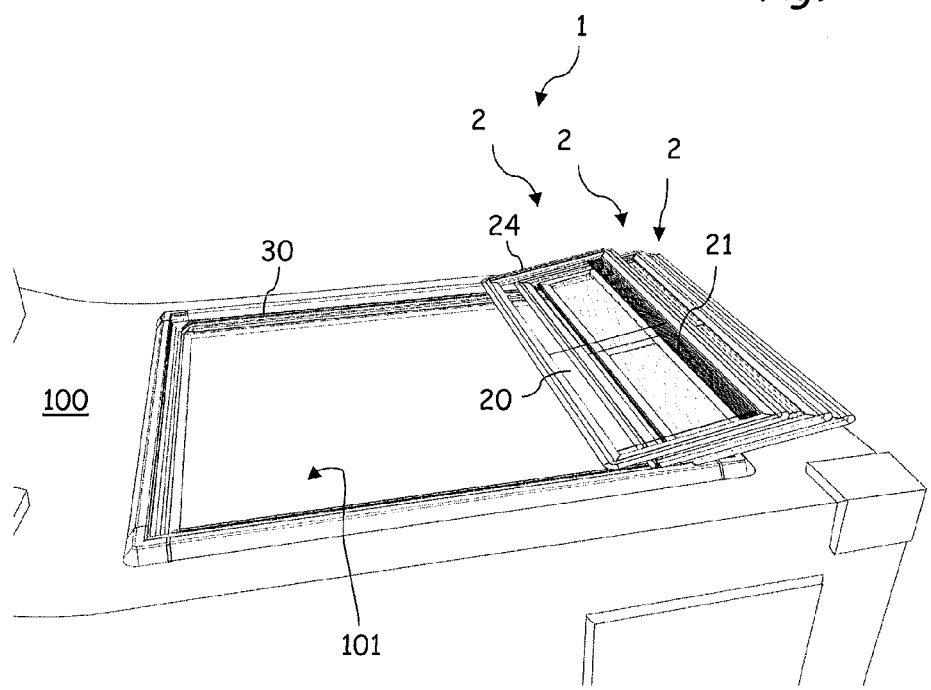
Figure 3:
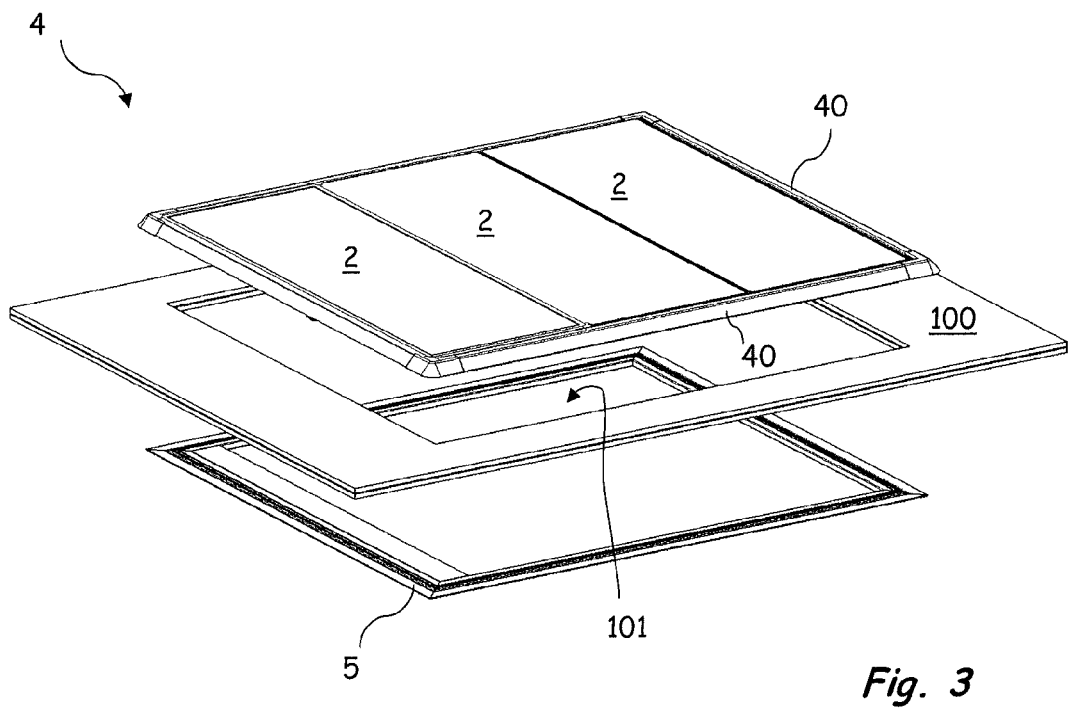
Figure 5:
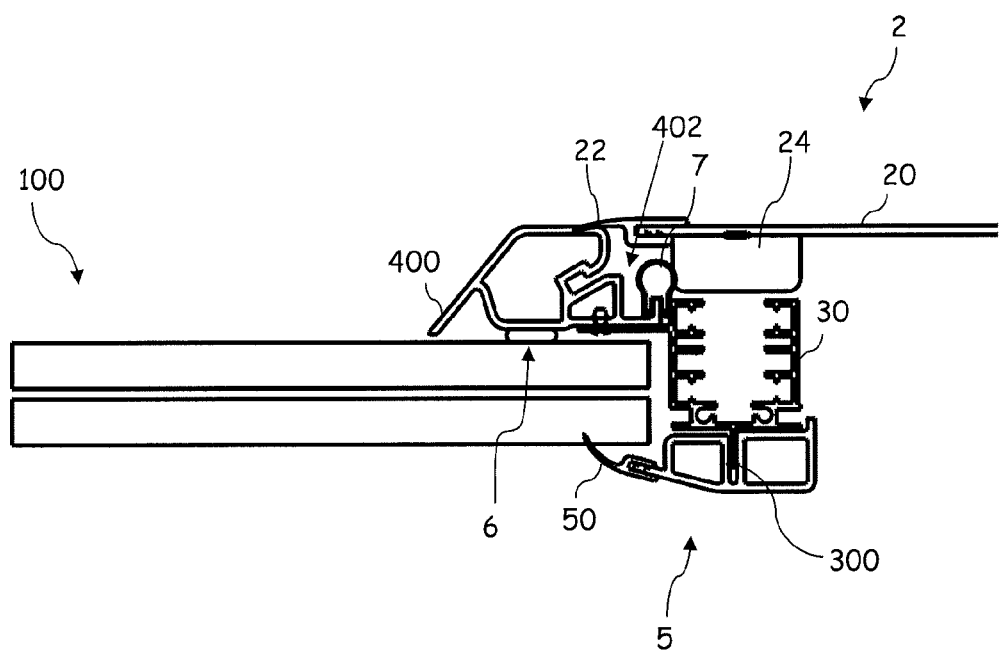
Figure 4:
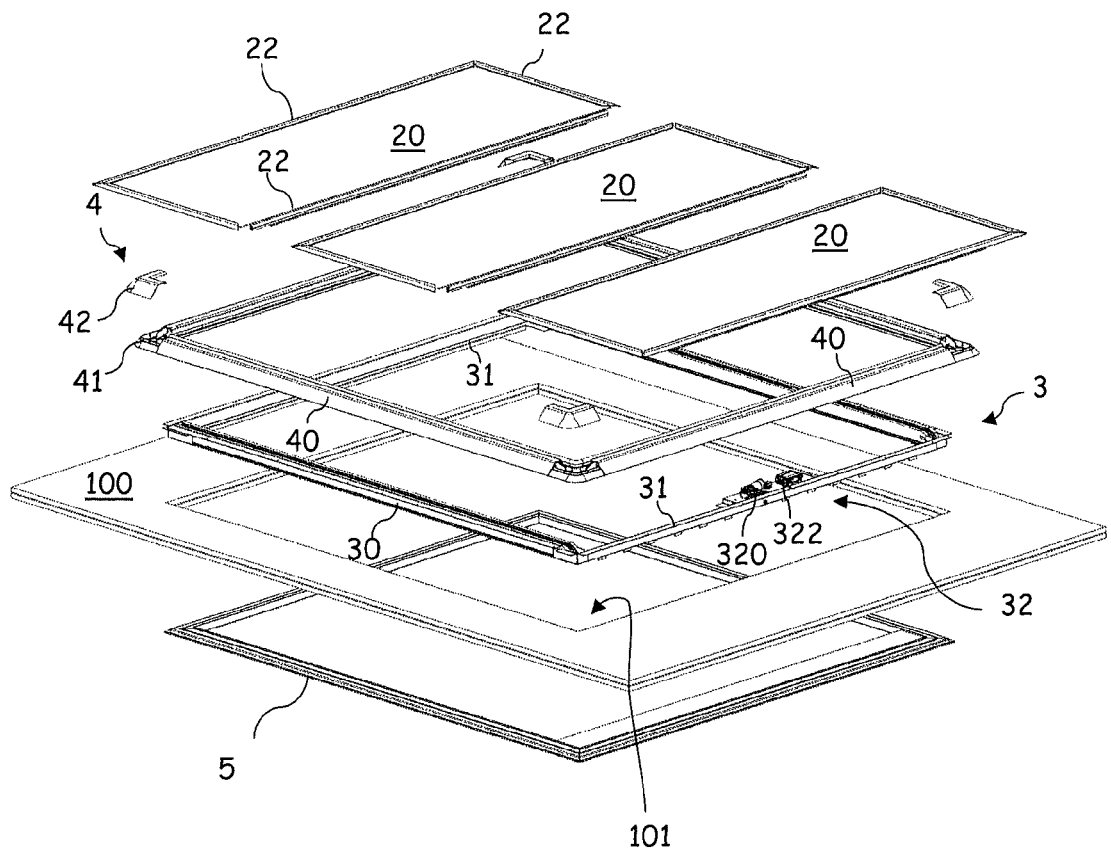
Figure 9:
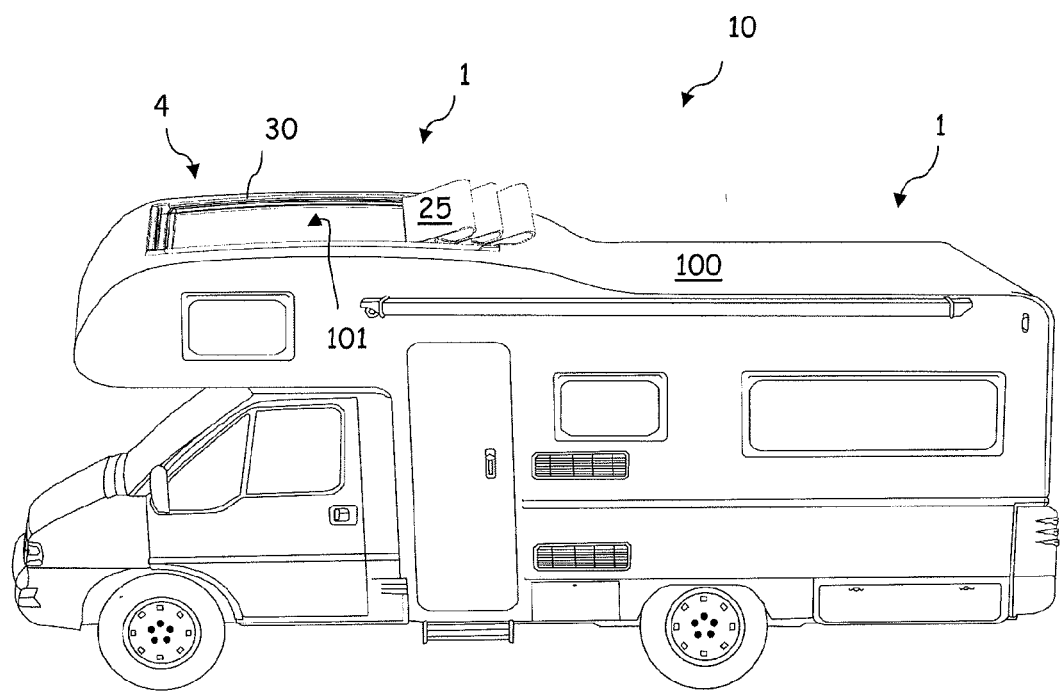
Figure 10:
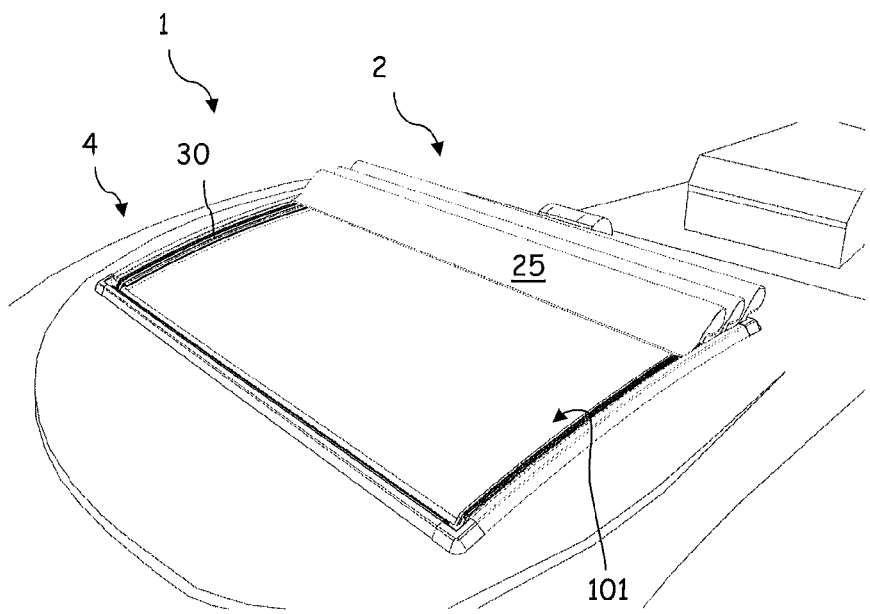

In the drawings, diagrammatically:

FIG. 1 shows a side view of a vehicle having a roof module according to a first exemplary embodiment in an open state, FIG. 2 shows a rear end of a vehicle having a roof module similar to FIG. 1 in an open state, in a perspective illustration, FIG. 3 shows the roof module according to FIG. 1 in a closed state before installation, FIG. 4 shows the roof module according to FIG. 1 in an exploded drawing, FIG. 5 shows a detail of a sectioned side view of a roof module according to FIGS. 1 to 4, FIGS. 6 to 8 show a lifter kinematic means for a roof segment of a roof module according to FIGS. 1 to 5, FIG. 9 shows a side view of a vehicle having a roof module according to a second exemplary embodiment in an open state, in a perspective illustration, and FIG. 10 shows a rear end of a vehicle having a roof module similar to FIG. 1 in an open state, in a perspective illustration.

FIG. 1 diagrammatically shows a vehicle 10 which is configured as a motor home having an accommodation facility, an opening 101 being provided on a vehicle roof 100. The opening 101 can be closed by means of a roof module 1. FIG. 2 shows a rear end of a vehicle 10 similar to FIG. 1 with a roof module 1. In the exemplary embodiments which are shown in FIGS. 1 and 2, the opening 101 is provided in a rear region of the vehicle 10. In other embodiments, an opening is provided as an alternative or in addition in the region of the front of the vehicle.

The roof module 1 comprises a plurality of, three in the exemplary embodiment which is shown, roof segments 2 which are mounted in each case in two lateral guide rails 30 which extend in the longitudinal direction of the vehicle 10, such that they can be moved between a closed position and an open position which is shown in FIGS. 1 and 2.

Furthermore, the roof module 1 comprises a circumferential load-bearing frame which, in the exemplary embodiment which is shown, is fastened to the vehicle roof 100 so as to surround the opening 101. Here, the load-bearing frame 4 which is shown supports the guide rails 30.

The roof segments 2 have in each case one frame 24 and one transparent or semi-transparent panel element 20 which is received in the frame 24. Furthermore, in each case one segment protective cover 21 which is designed as a pleated blind is provided on the frame 24.

FIG. 3 diagrammatically shows the roof module 1 according to FIG. 1 with three roof segments 2 in a closed position before an attachment to the diagrammatically shown vehicle roof 100 with the opening 101. The load-bearing frame 4 comprises four profiled strips 40 which are connected to form a rectangle. The three roof segments 2 adjoin one another and the load-bearing frame 4 in a sealing manner in the closed position which is shown and form a flat group. As can be seen in FIG. 2, the pre-assembled roof module can be placed from above and therefore from the outside onto the vehicle roof 100 in the exemplary embodiment which is shown and can thus be attached to the vehicle roof 100. In the exemplary embodiment which is shown, furthermore, the roof module 1 comprises a cover frame 5 which can be attached to a side of the vehicle roof 100 which faces the interior of the vehicle.

FIG. 4 shows the roof module 1 according to FIG. 3 in an exploded illustration. As can be seen in FIG. 4, the load-bearing frame 4 comprises four profiled strips 40 which are connected by means of corner pieces 41 to form a rectangle. In the exemplary embodiment which is shown, furthermore, four L-shaped cover pieces 42 are provided which can be attached to the corner pieces 41 so as to cover them. In the exemplary embodiment which is shown, the four profiled strips 40 are of structurally identical design. The length of the profiled strips 40 can be selected suitably in accordance with the size of the opening 101.

As can be seen in FIG. 4, furthermore, the roof module 1 comprises a kinematic unit 3 which has the two lateral guide rails 30. Furthermore, the kinematic unit 3 which is shown has two connecting elements 31, by means of which the guide rails 30 are connected to one another at their ends with the formation of a rectangle.

Furthermore, the kinematic unit 3 comprises an adjusting device 32 which can be actuated by motor with a drive motor 320 and a control unit 322 for controlling the drive motor 320. As an alternative or in addition to the adjusting device 32 which can be actuated by motor, an adjusting device which can be actuated manually is provided in other embodiments.

As can be seen in FIG. 4, furthermore, the three roof segments comprise in each case one panel element 20 which is preferably fastened in or to a frame which is not shown in FIG. 3. Sealing elements 22 are provided on the edges of the roof segments 2, with the result that the roof segments 2 adjoin one another in a sealing manner in the closed position and form a flat group.

FIG. 5 diagrammatically shows one detail of the roof module 1 in a sectioned side view after attachment to the vehicle roof 100. As can be seen in FIG. 5, a profiled strip 40 of the load-bearing frame 4 is fastened to the vehicle roof 100 by means of an adhesive bead 6 in the exemplary embodiment which is shown. Here, the adhesive bead 6 forms a water barrier. The profiled strip 40 which is shown has a limb 400 which protrudes in the direction of the vehicle roof 100 and by means of which a water jet which enters during normal use is deflected, with the result that an impact of water jets on the adhesive bead 6 is prevented during normal use.

A guide strip 30 which extends in the longitudinal direction is attached to the profiled strip 40. The profiled strip 40 and therefore the load-bearing frame 4 according to FIGS. 3 and 4 therefore serve as a support element for the guide strip 30. In alternative embodiments, the profiled strip 40 and the guide rail 30 are of single-piece design.

At one end which faces the vehicle interior, the guide rail 30 which is shown has a rib 300, to which the cover frame 5 is fastened, for example, by means of latching clips which are not shown. In the exemplary embodiment which is shown, the cover frame 5 has a sealing strip 50 which bears against an inner side of the vehicle roof 100. The sealing strip 50 permits tolerance compensation and a gap which remains between the roof module 1 and the vehicle roof 100 is covered at least visually. In advantageous embodiments, a penetration of dust or the like into a space between the guide rail 30 and the vehicle roof 100 is also prevented by means of the sealing strip.

Furthermore, the roof module 1 comprises a roof segment 2, the roof segment 2 comprising a panel element 20 in the exemplary embodiment which is shown, which panel element 20 is received by a frame 24. A sealing strip 22 is attached at one edge of the roof segment 2, more precisely at one edge of the panel element 20. Furthermore, a seal element 7 is provided on the load-bearing frame 4, more precisely on the profiled strip 40. In the closed position which is shown in FIG. 5, the roof segment 2 bears against the load-bearing frame 4, more precisely the profiled strip 40, with the formation of two sealing lines by means of the sealing strip 22 and the seal element 7.

The profiled strip which is shown has a channel 402 for conducting water, the water being discharged to the front, rear, left or right depending on the vehicle orientation. A water run-off is preferably provided on corner regions of the load-bearing frame 4, in particular in the corner pieces 41 which are shown in FIG. 3, via which water run-off water which is present in the channel 402 can flow away.

The roof segment 2 is guided in the guide rail 30 by means of sliding elements which are not shown in FIG. 5. Here, an adjustment of the roof segments 2 for movement between an open position and a closed position preferably takes place by means of a lifter kinematic means 8 which is shown diagrammatically in FIGS. 6 to 8.

The lifter kinematic means 8 which is shown in FIGS. 6 to 8 is designed in such a way that the roof segment 2 which is coupled to it is tilted with respect to the guide rails 30 during a movement from the closed position into the open position. Here, the arrangement is such that the movement from the closed position into the open position takes place to the right in the plane of the drawing. An end which is arranged on the left in the plane of the drawing is therefore also called the front end and an end which is arranged on the right in the plane of the drawing is therefore also called the rear end. FIGS. 6 to 8 in each case show a first kinematic assembly 80 which is assigned to a front roof segment and a second kinematic assembly 81 which is assigned to a second roof segment. Here, FIG. 6 shows the lifter kinematic means 8 in the case of closed roof segments. FIG. 7 shows the lifter kinematic means 8 after opening of the front, first roof segment. FIG. 8 shows the lifter kinematic means 8 after opening of the first two roof segments.

The kinematic assembly 80 of the lifter kinetic means 8 comprises a carriage 82 which can be moved by means of sliding blocks 820 along the guide rail 30 by means of an adjusting device which can be actuated by motor and/or manually. Furthermore, the kinematic assembly 80 of the lifter kinematic means 8 comprises two lifting levers 83, 84 which are articulated pivotably on the carriage 82 and are called the front lifting lever 83 and the rear lifting lever 84 in accordance with their arrangement in the direction of the guide rail 30. The lifting levers 83, 84 are attached pivotably by way of a first end in each case to a holding part 85 of a roof segment such that they are spaced apart from one another in the vehicle longitudinal direction. A second end of the lifting levers 84, 85 is coupled pivotably to the carriage 82. The front lifting lever 83 is guided by means of a sliding block 831 in a slotted guide 301 on the guide rail 30. Furthermore, the kinematic assembly 80 comprises an actuating element 86 which can be adjusted relative to the carriage 82 along the guide rail. The actuating element 86 engages with a first and a second pin (not visible) into slotted guides 830, 840 of the lifting levers 83, 84. In the position which is shown in FIG. 6, the actuating element 86 prevents raising up of the holding part 85 and therefore of the roof segment. The roof segment is also held in the closed position according to FIG. 6 on account of the weight. For reliable closure and in order to avoid rattling or the like, spring elements which are not shown in further detail are preferably provided.

In order to open the roof segment, first of all the actuating element 86 is adjusted towards the rear relative to the carriage 82, that is to say to the right in the plane of the drawing. The movement is transmitted to the rear lifting lever 84 by means of the slotted guides 840, with the result that a roof segment which is connected to the holding part 85 is raised up. The maximum displacement travel of the actuating element 86 relative to the carriage 82 is limited. After the maximum displacement travel is reached, the movement is transmitted to the carriage 82. The front lifting lever 83 is driven during an adjusting movement of the carriage 82 and is pivoted on account of the guidance in the slotted guide 301. The lifting levers 83, 84 are dimensioned in such a way that the roof segment which is connected to the holding part 85 is tilted during a pivoting movement of the lifting levers 83, 84, a rear end (that is to say, arranged on the right in FIG. 6) of the roof segment being raised up further than a front end. For this purpose, the rear lifting lever 84 is pivoted over a greater angle than the front lifting lever 83. FIG. 7 diagrammatically shows the lifter kinematic means 8 after opening of the front, first roof segment. During a further displacement of the actuating element 86 with the carriage 82, a front coupling element 87 of the carriage 82 comes into contact with the second kinematic assembly 81 which is assigned to a second roof segment. The second kinematic assembly 81 likewise comprises a carriage 88 and an actuating element 89. When the first kinematic assembly 80 comes into contact with the second kinematic assembly 81, first of all the actuating element 89 is adjusted relative to the carriage 88, a lifting lever 810, 812 of the second kinematic assembly 81 being pivoted, with the result that the associated roof segment is first of all raised up and is then tilted. During a further movement, the carriage 88 is moved together with the carriage 82 of the first kinematic assembly 80.

For closure, the actuating element 86 is moved towards the front, that is to say to the left in FIGS. 6 to 8. Here, the second carriage 88 remains connected to the first carriage 82 by means of the coupling element 87 until the closed position is reached. The sliding block 831 of the front lifting lever 83 prevents pivoting of the lever 83 into a closed position. A pivoting movement of the front lifting lever 83 becomes possible only when the slotted guide 301 is reached in an end position of the movement.

FIG. 9 diagrammatically shows a vehicle 10 which is designed as an alcove motor home with an accommodation facility, an opening 101 being provided on a vehicle roof 100 in the region of the alcove. The opening 101 can be closed by means of a roof module 1. FIG. 10 shows an alcove of a vehicle 10 similar to FIG. 9 with a roof module 1.

The roof module 1 is similar to the roof module according to the preceding figures and comprises a circumferential load-bearing frame 4 which is fastened to the vehicle roof 100 so as to surround the opening 101. The load-bearing frame 4 which is shown supports guide rails 30.

In contrast to the preceding embodiments, the roof segment in the embodiment according to FIGS. 9 and 10 comprises a foldable panel element 25. The foldable panel element 25 is guided in the guide rails 30 of the roof module 1 by means of bows (not visible).

The bows can preferably be fixed in a closed position (not shown) by means of a locking mechanism.

The roof module 1 according to FIGS. 9 and 10 is provided in a rear region of the vehicle 10 in other embodiments.

The invention claimed is:

1. A roof module for a land and/or water vehicle having an accommodation facility, the roof module comprising:
   a kinematic unit with two lateral guide rails
   at least one roof segment which is mounted in the guide rails such that it can be moved between a closed position and an open position, and
   a circumferential load-bearing frame with four profiled strips, said four profiled strips comprising two transversal profiled strips and two lateral profiled strips which are connected to form a rectangle, which load-bearing frame can be fastened to a vehicle roof having an opening so as to surround the opening or in the opening with the formation of a water barrier,
   wherein the two lateral guide rails of the kinematic unit each are mounted to one of the two lateral profiled strips of the load-bearing frame, and
   wherein the at least one roof segment bears against the load-bearing frame in the closed position with the formation of at least a first sealing line, the guide rails being arranged within the first sealing line.

2. The roof module according to claim 1, wherein the load-bearing frame has four structurally identical profiled strips, wherein the four profiled strips are connected by means of corner pieces.

3. The roof module according to claim 1, wherein a first circumferential seal element is provided on the load-bearing frame, against which first circumferential seal element the at least one roof segment bears in the closed position with the formation of the first sealing line.

4. The roof module according to claim 1, wherein the profiled strips have in each case one channel for conducting water, and a water run-off is provided on corner regions of the load-bearing frame.

5. The roof module according to claim 1, wherein the height of the profiled strips is selected in such a way that the load-bearing frame protrudes beyond the at least one roof segment in the closed position.

6. The roof module according to claim 1, wherein the kinematic unit comprises an adjusting device with a drive motor and a control unit for controlling the drive motor for adjusting the position of the at least one roof segment, wherein the adjusting device can be actuated by motor.

7. The roof module according to claim 6, wherein an anti-pinch protection means is realized by means of the control unit.

8. The roof module according to claim 1, wherein the at least one roof segment has a frame and a panel element which is transparent or semi-transparent and is received in or on the frame.

9. The roof module according to claim 8, wherein the at least one roof segment is guided in the guide rails by means of a lifter kinematic means, the lifter kinematic means being designed to raise up and tilt the at least one roof segment with respect to the guide rails during a movement from the closed position.

10. The roof module according to claim 8, wherein a plurality of roof segments are provided which adjoin one another in a sealing manner in a closed position and form a flat group.

11. The roof module according to claim 1, wherein the roof segment comprises a foldable panel element which is guided by means of bows in the guide rails.

12. The roof module according to claim 1, wherein a cover frame is provided which is arranged at an inner side of the vehicle roof, which cover frame is mounted on at least one of the load-bearing frame and the guide rails.

13. A vehicle having an accommodation facility and having a roof module according to claim 1.

14. The roof module according to claim 1, wherein the at least one roof segment bears against the load-bearing frame in the closed position with the formation of the first sealing line and a second sealing line, the guide rails being arranged within the first sealing line and within the second sealing line.

15. The roof module according to claim 2, wherein the profiled strips have in each case one channel for conducting water, and wherein a water run-off is provided in the corner pieces.

16. The roof module according to claim 6, wherein a protective cover selected from the group comprising a privacy screen cover, a UV protective cover, a mosquito net and a fly screen is provided on the opening, and an anti-pinch protection means is realized by means of the control unit.

17. The roof module according to claim 16, wherein a position of a protective cover is detected by the anti-pinch protection means.

18. The roof module according to claim 9, wherein the lifter kinematic means is further designed to lock the at least one roof segment in the closed position.

19. The roof module according to claim 10, wherein a locking mechanism is provided and at least one roof segment can be fixed in a closed position by means of the locking mechanism.

20. The roof module according to claim 11, wherein a locking mechanism is provided and at least one bow can be fixed in at least one position by means of the locking mechanism.

21. A roof module for a land and/or water vehicle having an accommodation facility, the roof module comprising
   a kinematic unit with two lateral guide rails,
   at least one roof segment which is mounted in the guide rails such that it can be moved between a closed position and an open position,
   a circumferential load-bearing frame with two transversal profiled strips and two lateral profiled strips which are connected to form a rectangle, which load-bearing frame can be fastened to a vehicle roof having an opening so as to surround the opening or in the opening with the formation of a water barrier, and
   wherein
   the two lateral guide rails of the kinematic unit each are formed in one piece with one of the two lateral profiled strips of the load-bearing frame, and
   the at least one roof segment bears against the load-bearing frame in the closed position with the formation of at least a first sealing line, the guide rails being arranged within the first sealing line.

* * * * *